(12) United States Patent
Grunnet et al.

(10) Patent No.: US 12,049,869 B2
(45) Date of Patent: Jul. 30, 2024

(54) WIND TURBINE BLADE CONTROL FOR A DEGRADATION STATE OF THE BLADE

(71) Applicant: VESTAS WIND SYSTEMS A/S, Aarhus N. (DK)

(72) Inventors: Jacob Deleuran Grunnet, Tranbjerg J (DK); James Alexander Nichols, Epsom (GB); Fabio Caponetti, Åbyhøj (DK); Karthik Vasudevan, Viby J (DK)

(73) Assignee: VESTAS WIND SYSTEMS A/S, Aarhus (DK)

( * ) Notice: Subject to any disclaimer, the term of this patent is extended or adjusted under 35 U.S.C. 154(b) by 30 days.

(21) Appl. No.: 18/010,771

(22) PCT Filed: Jun. 10, 2021

(86) PCT No.: PCT/DK2021/050182
§ 371 (c)(1),
(2) Date: Dec. 15, 2022

(87) PCT Pub. No.: WO2021/254573
PCT Pub. Date: Dec. 23, 2021

(65) Prior Publication Data
US 2023/0265829 A1 Aug. 24, 2023

(30) Foreign Application Priority Data

Jun. 15, 2020 (DK) .......................... PA 2020 70384
Apr. 23, 2021 (DK) .......................... PA 2021 70184

(51) Int. Cl.
F03D 7/02 (2006.01)

(52) U.S. Cl.
CPC .... *F03D 7/0224* (2013.01); *F05B 2270/1033* (2013.01); *F05B 2270/328* (2013.01)

(58) Field of Classification Search
CPC .............................. F03D 7/0224; F03D 17/00
See application file for complete search history.

(56) References Cited

U.S. PATENT DOCUMENTS

| 8,096,761 B2 * | 1/2012 | Fric | F03D 7/043 416/37 |
| 10,184,450 B2 * | 1/2019 | Wilson | F03D 17/00 |

(Continued)

FOREIGN PATENT DOCUMENTS

| CA | 3009204 A1 | 12/2018 |
| CN | 110088467 A | 8/2019 |

(Continued)

OTHER PUBLICATIONS

European Patent Office, Communication pursuant to Article 94(3) EPC for European Patent Application No. 21734275.7, dated Jan. 1, 2024.

(Continued)

*Primary Examiner* — Christopher R Legendre
(74) *Attorney, Agent, or Firm* — Patterson + Sheridan, LLP

(57) ABSTRACT

A method of controlling a wind turbine blade of a wind turbine comprising: providing data comprising a plurality of pitch angles of the wind turbine blade and corresponding expected power coefficients for the wind turbine, each pitch angle corresponding to a maximum expected power coefficient for a degradation state of the wind turbine blade; obtaining a current power coefficient of the wind turbine; determining a desired pitch angle for the wind turbine blade, the desired pitch angle being equal to a pitch angle from the dataset corresponding to an expected power coefficient equal to the current power coefficient; and changing a pitch angle of the wind turbine blade to the desired pitch angle.

9 Claims, 7 Drawing Sheets

(56) References Cited

U.S. PATENT DOCUMENTS

| | | | |
|---|---|---|---|
| 2010/0098540 A1 | 4/2010 | Fric et al. | |
| 2023/0265829 A1* | 8/2023 | Grunnet | F03D 80/40 416/1 |

FOREIGN PATENT DOCUMENTS

| | | | |
|---|---|---|---|
| EP | 2177754 | A2 | 4/2010 |
| EP | 2719895 | A1 | 4/2014 |
| EP | 3088733 | A1 | 11/2016 |
| EP | 3139038 | A1 | 3/2017 |
| WO | 2007129907 | A2 | 11/2007 |
| WO | 2018224103 | A1 | 12/2018 |

OTHER PUBLICATIONS

Danish Patent Office, Search Report for Danish Patent Application No. PA 2020 70384, dated Dec. 9, 2020.
International Search Report and Written Opinion for PCT Application No. PCT/DK2021/050182, dated Sep. 13, 2021.

* cited by examiner

WIND TURBINE BLADE CONTROL FOR A DEGRADATION STATE OF THE BLADE

FIELD OF THE INVENTION

The present invention relates to control of a wind turbine blade in a situation where the blade is in a degradation state.

BACKGROUND OF THE INVENTION

It is a known problem that a degradation state of the blade may be caused by ice or other debris building up on a wind turbine blade and possibly reducing the aerodynamic performance of the blade. In particular, debris on a blade surface may cause a blade to stall.

In order to optimise aerodynamic performance of blades, many wind turbines have automated blade control systems for adjusting the pitch angle of the blade. However, as debris build-up or other degradation of the blade may worsen the aerodynamic performance of the blade, such control systems may fail to provide optimal performance for all blade conditions.

SUMMARY OF THE INVENTION

A first aspect of the invention provides a method of controlling a wind turbine blade of a wind turbine comprising; providing data comprising a plurality of pitch angles of the wind turbine blade and corresponding expected power coefficients for the wind turbine, each pitch angle corresponding to a maximum expected power coefficient for a degradation state of the wind turbine blade; obtaining a current power coefficient of the wind turbine; determining a desired pitch angle for the wind turbine blade, the desired pitch angle being equal to a pitch angle from the dataset corresponding to an expected power coefficient equal to the current power coefficient; and changing a pitch angle of the wind turbine blade to the desired pitch angle.

By providing data over a range of wind turbine degradation states and mapping a power coefficient to a pitch angle from said data, the method may be agnostic of the degradation state of the wind turbine blade and may therefore function over a wide range of wind turbine blade degradation states. This may improve the robustness of the control scheme. In an embodiment, the pitch angle is a collective or common pitch angle to be set for all blades of the wind turbine.

The method may further comprise, after the changing of the pitch angle of the wind turbine blade: obtaining a new power coefficient of the wind turbine blade; determining a new desired pitch angle, the new desired pitch angle being equal to a pitch angle from the data set corresponding to an expected power coefficient equal to the estimated new power coefficient; and changing the pitch angle of the wind turbine blade to the new desired pitch angle. In this manner, the method may be implemented in an iterative manner where the new desired pitch angle is set iteratively in the next step based on the obtained power coefficient in the former step.

The method may further comprise, between the changing of the pitch angle and the measuring of the new power coefficient, waiting a predetermined amount of time. The predetermined amount of time may be between 10 and 30 seconds, or longer such as at least 30 seconds.

Measuring the current power coefficient and/or the new power coefficient may comprise taking a plurality of measurements over time and taking an average. The measuring may comprise applying a low pass filter to the measured data, to limit pitch activity and thereby pitch bearing wear.

The method may further comprise calculating a difference between the desired pitch angle and the new desired pitch angle, and stopping the method if the difference is below a predetermined threshold. This may imply that the power coefficient of the wind turbine blade is proximate a maximum for the degradation state of the wind turbine blade.

The data may further comprise a plurality of pitch angles and corresponding expected power coefficients at a plurality of tip speed ratios.

The method may further comprise estimating a current tip speed ratio for the wind turbine blade, and determining the desired pitch angle based on the current tip speed ratio.

Obtaining the current power coefficient and/or the new power coefficient may comprise taking a plurality of measurements over time and taking an average. The measuring may comprise applying a low pass filter to the measured data to reduce the resulting pitch activity. The measurements may be measurements of wind speed and/or rotor speed.

The data may comprise pitch angles corresponding to a maximum expected power coefficient for a state of the blade having no degradation. The expected maximum power coefficient may therefore be the maximum power coefficient obtainable from the rotor to which the blade is attached.

The method may further comprise comparing the current power coefficient to the maximum power coefficient of a blade having no degradation.

The method may further comprise using an alternative blade control scheme if the difference between the current power coefficient and the maximum power coefficient of a blade having no degradation is below a predetermined threshold. This may imply that debris on the blade has been removed.

The method may further comprise determining a gain scheduling value to be multiplied with the current power coefficient. Application of a gain scheduling to the power coefficient can tune the sensitivity of the power coefficient to a given condition.

In a situation where the pitch angle is changed to a new desired pitch angle in an iterative manner, while the wind turbine blade is determined to be in a degradation state, the gain scheduling value may advantageously be set as a function of the difference between the desired pitch angle and the pitch angle corresponding to the pitch angle with the maximal power coefficients for a state of the blade having no degradation.

In an embodiment, a determination that the wind turbine blade is in a degradation state is obtained, and if the blade is determined to be in a degraded state the desired pitch angle for the wind turbine blade is set as the desired pitch angle being equal to the pitch angle from the dataset corresponding to the expected power coefficient equal to the current power coefficient, otherwise if the wind turbine blade is not determined to be in the degradation state the desired pitch angle is set as the pitch angle corresponding to the maximum power coefficient for a blade having no degradation. In this manner the determination of that the blade is in a degraded state can be made an enabler of setting the pitch angle to the desired pitch angle based on the expected power coefficient.

Determination that the wind turbine blade is in a degradation state may be done in a number of ways. For example, a detection that the power production has gone below an expected level for a period of time, possibly together with a low temperature being present, may be taken as a determination that ice is present on the blades. Reduced power production for a prolonged period of time may be taken as an indication that a degraded state is present irrespectively of the cause. Moreover, specific detectors may also be present, such as ice detectors.

The method may further comprise determining an actual degradation state of the wind turbine blade based on the current power coefficient and the pitch angle. The degradation state may be such states as; light degradation, heavy degradation and severe degradation. Or other appropriate state assignments.

The method may further comprise when the desired pitch angle is outside a predetermined range, applying a correction factor to the desired pitch angle to give a corrected pitch angle, the corrected pitch angle being within the predetermined range.

The method may further comprise determining whether ice or sand is present on the blade. The method may alternatively further comprise detecting other debris on the blade. Any kind of debris may result in power loss, but degradation due to ice or sand are among the most commons causes.

The method may further comprise determining whether the measured power coefficient is valid; and in the case that the measured power coefficient is not valid, determining the desired pitch angle based on a pitch angle corresponding to a maximum power coefficient for a blade having no degradation.

Determining the desired pitch angle may further comprise applying a positive offset to the pitch angle corresponding to a maximum power coefficient for a blade having no degradation.

A second aspect of the invention provides a computer program product comprising software code adapted to control a wind turbine blade when executed on a data processing system, the computer program product being adapted to perform a method according to the first aspect.

A third aspect of the invention provides a wind turbine comprising: at least one wind turbine blade, and a control system arranged to control the wind turbine blade in accordance with the first aspect of the invention.

BRIEF DESCRIPTION OF THE DRAWINGS

Embodiments of the invention will now be described with reference to the accompanying drawings, in which.

DETAILED DESCRIPTION OF EMBODIMENTS

Figure 1:
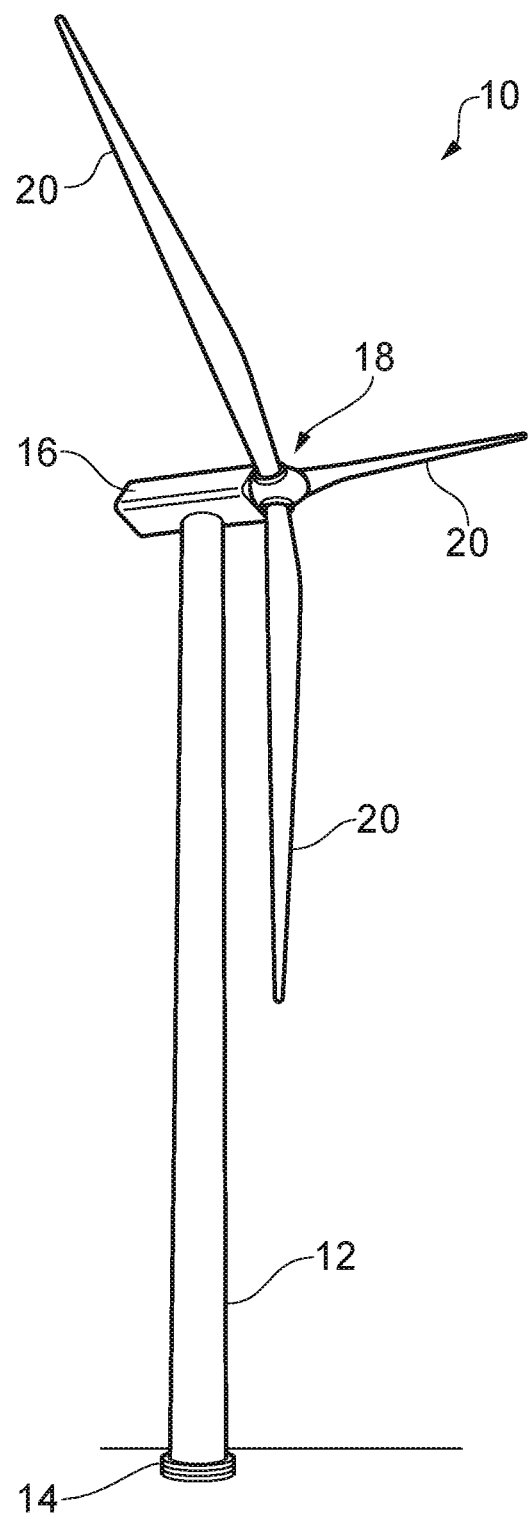
FIG. 1 shows a general view of a wind turbine.

FIG. 1 shows a wind turbine 10. The wind turbine 10 has a tower 12 extending from a foundation 14 and supporting a nacelle 16. A rotor 18, having a plurality of blades 20, is rotatably attached to the nacelle 16. Incident wind on the wind turbine 10 generates lift on the blades 20, rotating the rotor 18. The rotor 18 then transfers rotational movement to a generator housed within the nacelle 16 in order to generate electricity. The electricity generated may then be transferred to an electrical grid.

However, in a situation where ice, sand or other debris build up on a wind turbine blade 20, the aerodynamic characteristics of the blade may change and so the torque transferred to the generator and therefore the amount of electricity produced may be reduced. The lift and/or drag curves of the blade may also change, risking a blade stalling unexpectedly.

The aerodynamic performance of the blade may also be reduced or otherwise changed due to abrasion of the leading edge or other damage to the wind turbine blade.

Figure 2:
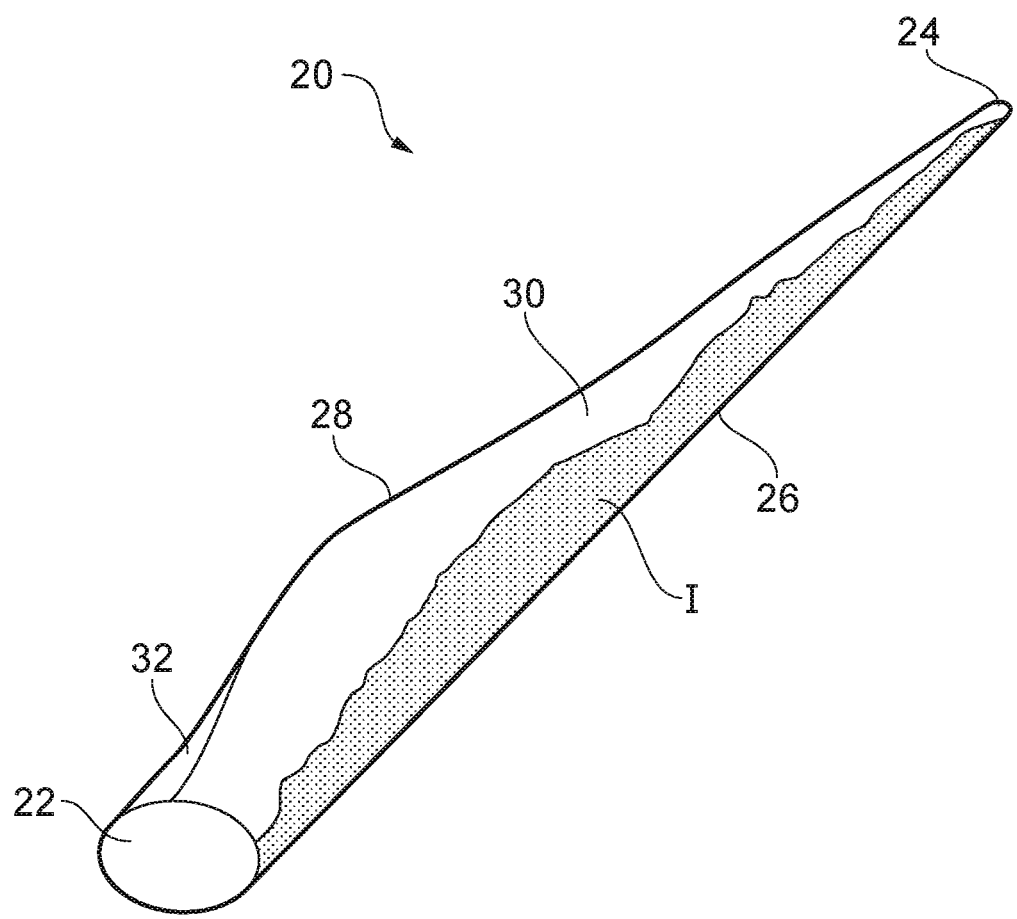
FIG. 2 shows a general view of a wind turbine blade.

An example of a degraded wind turbine blade is shown in FIG. 2. The wind turbine blade 20 extends from a root end 22 to a tip end 24, having a leading edge 26 and a trailing edge 28, the leading edge 26 being arranged to face into the wind and the trailing edge 28 being arranged to face out of the wind. The wind turbine blade 20 also has two major aerodynamic surfaces: a pressure surface 30 and a suction surface 32. In FIG. 2, ice I can also be seen, which has built up on the pressure surface 30 of the wind turbine blade 20 near the leading edge 26. It will, however, be understood that ice and other debris may build up anywhere on a wind turbine blade, such as at the trailing edge 28 or may be localised at the root end 22 or at the tip end 24.

In order to obtain data over a range of wind turbine blade degradation states, wind turbine blades may be simulated or modelled with a range of different debris conditions and may be categorised according to their reduction in power coefficient.

Figure 3:
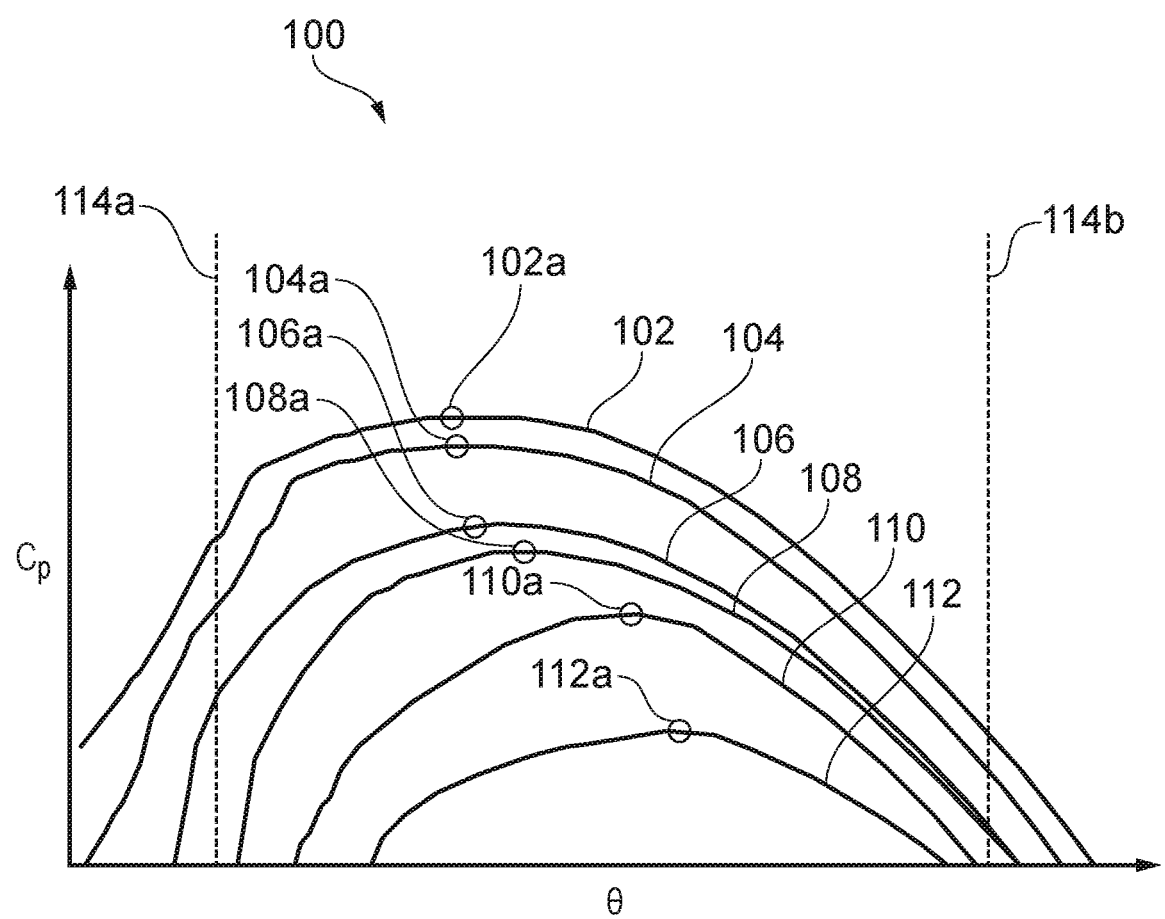
FIG. 3 is a graph showing variations in power coefficient with pitch angle for different wind turbine blade degradation states.

FIG. 3 is a graph showing power coefficient $C_p$ for a range of blade pitch angles θ (theta) for a single wind turbine blade in multiple degradation states at a particular tip speed ratio. The top line 102 shows the variation of power coefficient $C_p$ for a range of pitch angles θ (theta) for a blade in a state of no degradation—that is a blade performing as it is designed to do, with no debris attached or abrasion suffered. The point 102a illustrates a maximum power coefficient for a blade having no degradation. This is therefore the maximum power coefficient that may be achieved by such a wind turbine blade, according to the data available.

The second line 104 illustrates a blade having light degradation, such as a small amount of ice or sand deposited upon it. The point 104a is a maximum power coefficient for a blade in this degradation state, at a pitch angle corresponding to the maximum power coefficient. It will be understood that both the power coefficient and the pitch angle for the point 104a may be different from the power coefficient and corresponding pitch angle for the maximum power coefficient for an un-degraded blade 102a.

The second line 104 may be representative of a power coefficient for a specific blade with a specific degradation or may be taken as an average of multiple different degradation states for a blade, each degradation state having a similar magnitude of reduction in power coefficient $C_p$.

The subsequent, approximately concentric lines 106, 108, 110, 112 each show variations in power coefficients for the wind turbine blade at increasingly severe states of degradation. The innermost line 112 shows the variation in power coefficient when the blade is in a state having severe degradation, and with the greatest reduction in power coefficient. Each line has a respective maximum power coefficient, denoted by points 106a, 108a, 110a, 112a and each maximum power coefficient is at a corresponding pitch angle.

The data required for the control scheme detailed herein may comprise at least the coordinates of at least two maxima or points close to two of the maxima.

Also labelled on the graph 100 of FIG. 3 are lower and upper limits 114a, 114b of pitch angles, within which the pitch angle of the wind turbine blade should remain. The data for determining power coefficient may be unreliable outside the limits 114a, 114b, and so, in cases where a desired pitch angle is found to be outside the lower and upper limits 114a, 114b, a correction factor may be applied in order to move the pitch angle into a region where the data may be reliable. Thereby, a more robust control method may be provided.

It should be noted that the graph shown in FIG. 3 is for one particular tip speed ratio and that different graphs with different data may be obtained for different tip speed ratios. Overall, a three-dimensional graph may be obtained, with surfaces showing the power coefficient for points corresponding to particular tip speed ratios and pitch angles. The lines 102-114 may therefore be replaced with surfaces. A maximum value may be determined for each degradation state at each tip speed ratio.

It may be assumed, during the control method, that the tip speed ratio remains constant, as the load on the generator may be varied in order to maintain a constant rotational velocity of the rotor 16 and the wind speed may be substantially constant. Alternatively, the tip speed ratio may be recalculated during the method of control and the maxima may be altered accordingly.

Figure 4:
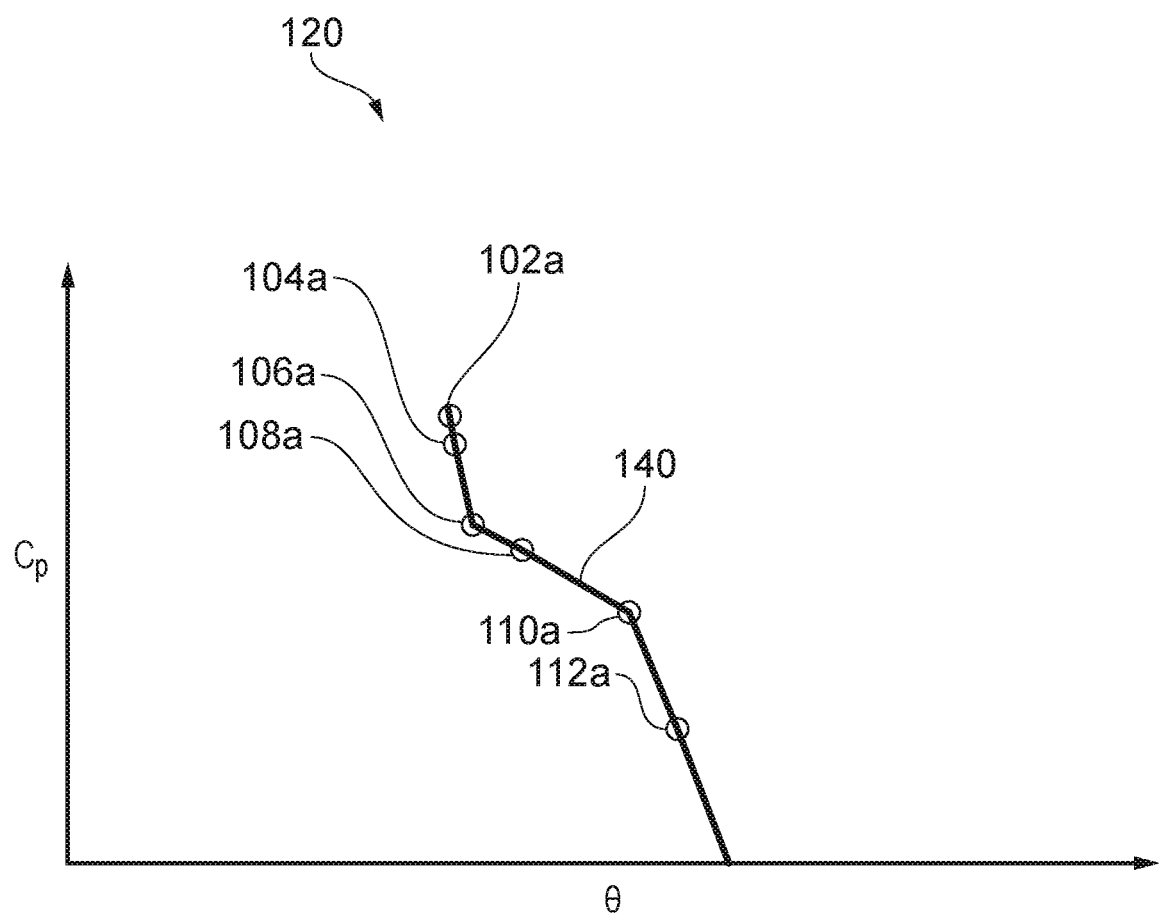
FIG. 4 is a graph showing maximum expected power coefficients for different wind turbine blade degradation states.

FIG. 4 shows a second graph 120. The graph 120 shows a line 140 through the maxima 102a-112a. The data provided to the control system for applying this method may be points along the line 140. The line 140 may, as explained above, where multiple tip speed ratios are possible, be a surface, as the maximum power coefficients and corresponding pitch angles may vary as the tip speed ratio varies.

Figure 5:
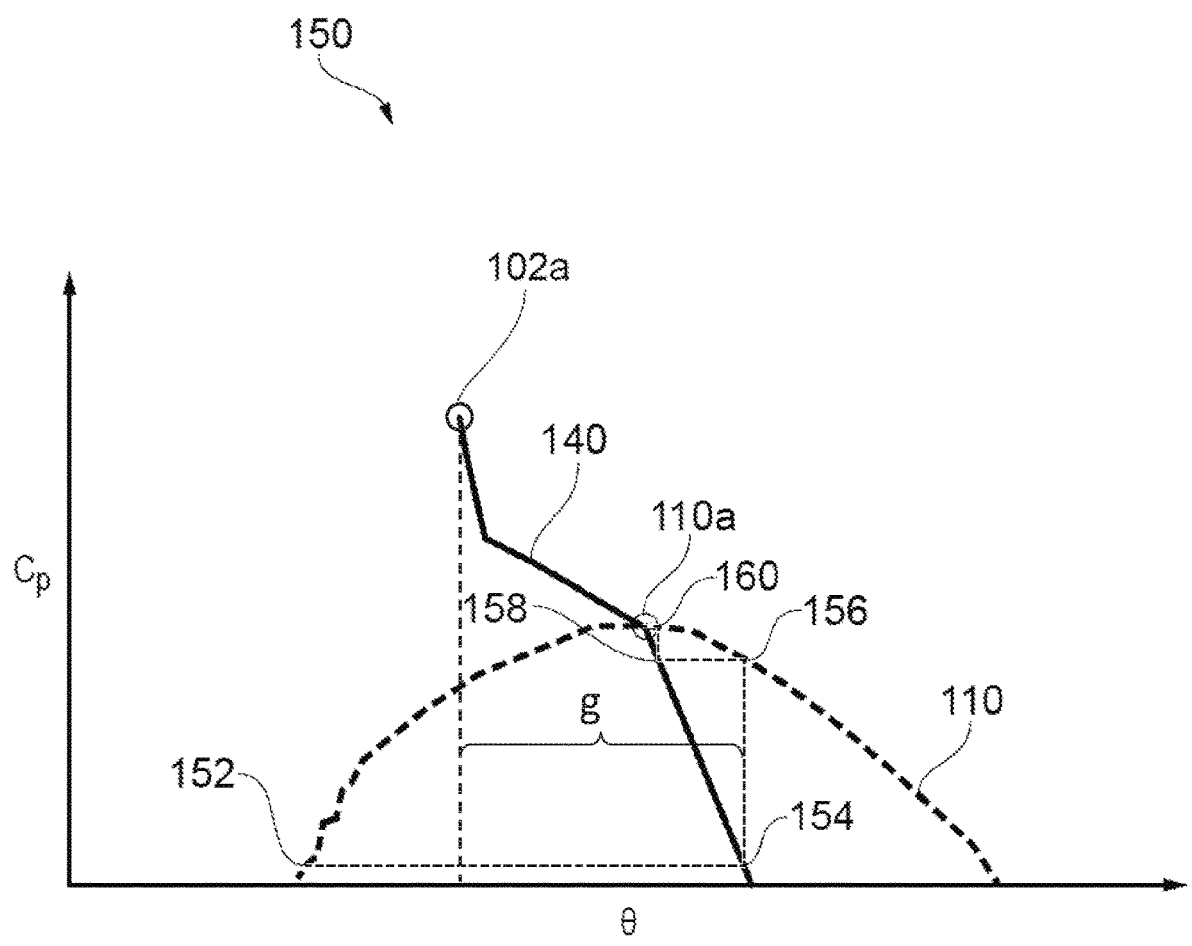
FIG. 5 is a graph illustrating a method of controlling a wind turbine blade

FIG. 5 illustrates how the above-described data may be used within a control scheme in order to control a wind turbine blade.

The graph shown in FIG. 5 is for a blade having a degradation state corresponding to a line 110. However, the control system may be agnostic as to the degradation state, and the degradation state may be determined only after the control scheme has finished, with the power coefficient of the blade converging to near a maximum for the degradation state of the blade.

The blade may originally be operating at point 152. While the pitch angle θ (theta) for point 152 may give a high power coefficient $C_p$ for an un-degraded blade, it may provide a sub-optimal power coefficient for a blade suffering degradation. Upon measurement of the power coefficient $C_p$, it may be determined that the blade is operating at point 152 and so the control method may be initiated as such a low power coefficient may be indicative of a degraded blade and/or the blade operating in stall.

Upon the detection of stall and/or blade degradation due to a low power coefficient being determined, the control scheme may find a corresponding point 154 on the line of maxima 140 with a power coefficient equal to the measured power coefficient. The calculated, or desired, pitch angle determined at point 154 may therefore be applied to the blade, which may be moved to obtain the pitch angle equivalent to that at point 154.

When such a pitch angle is applied to the blade, the blade will operate at a new operating point, as shown at point 156. It can be seen that the power coefficient at point 156 is significantly higher than the power coefficient at point 152 and thus the method may improve the amount of power generated by the wind turbine.

In order to further improve the power generated, the method may be applied iteratively. Therefore, the power coefficient at point 156 may be obtained and a second point 158 on the line of maxima 140 may be found, the power coefficient of point 158 being the same as the power coefficient of point 156. The pitch angle corresponding to point 158 on line 140 may then be applied to the blade such that the blade operates at point 160.

Upon determining the power coefficient at point 160, the distance from 160 to the line of maxima 140 may be measured and it may be determined that the point 160 is closer to the line of maxima 140 than a predetermined threshold. Therefore, it may be assumed that the point 160 is proximate a maximum expected power coefficient 110a for a blade having the degradation state represented by line 110. Once convergence has been established, the degradation state of the wind turbine blade may be determined. Further, it may be determined that no further iterations of the method are necessary, as the blade is operating at a maximum power coefficient for its current degradation state. Therefore, an alternative control method may be employed.

While the method of control has been described above with reference to a graph, it will be understood that a lookup table may be used in order to implement the method. This may also involve some level of interpolation. The lookup table may be three-dimensional, having power coefficient values across different degradation states, different tip speed ratios and different pitch angles.

As is also shown in FIG. 5, the method may further comprise determining a gain scheduling value, g, to be multiplied with the current power coefficient. In the iterative situation of FIG. 5 the pitch angle is changed to a new desired pitch angle in a stepwise manner towards the maximum power coefficient 110a. In general, such gain scheduling value will influence the step size. Advantageously, the gain scheduling value, g, may be set as a function of the difference between the desired pitch angle and the pitch angle corresponding to the pitch angle with the maximal power coefficients for a state of the blade having no degradation. In this manner, the new desired pitch angle setting is made a function of the maximal power coefficients of the state of the blade having no degradation, with the effect that the new desired pitch angle can be adjusted in accordance with how close the desired pitch angle is to the ideal situation of no degradation.

Figure 6:
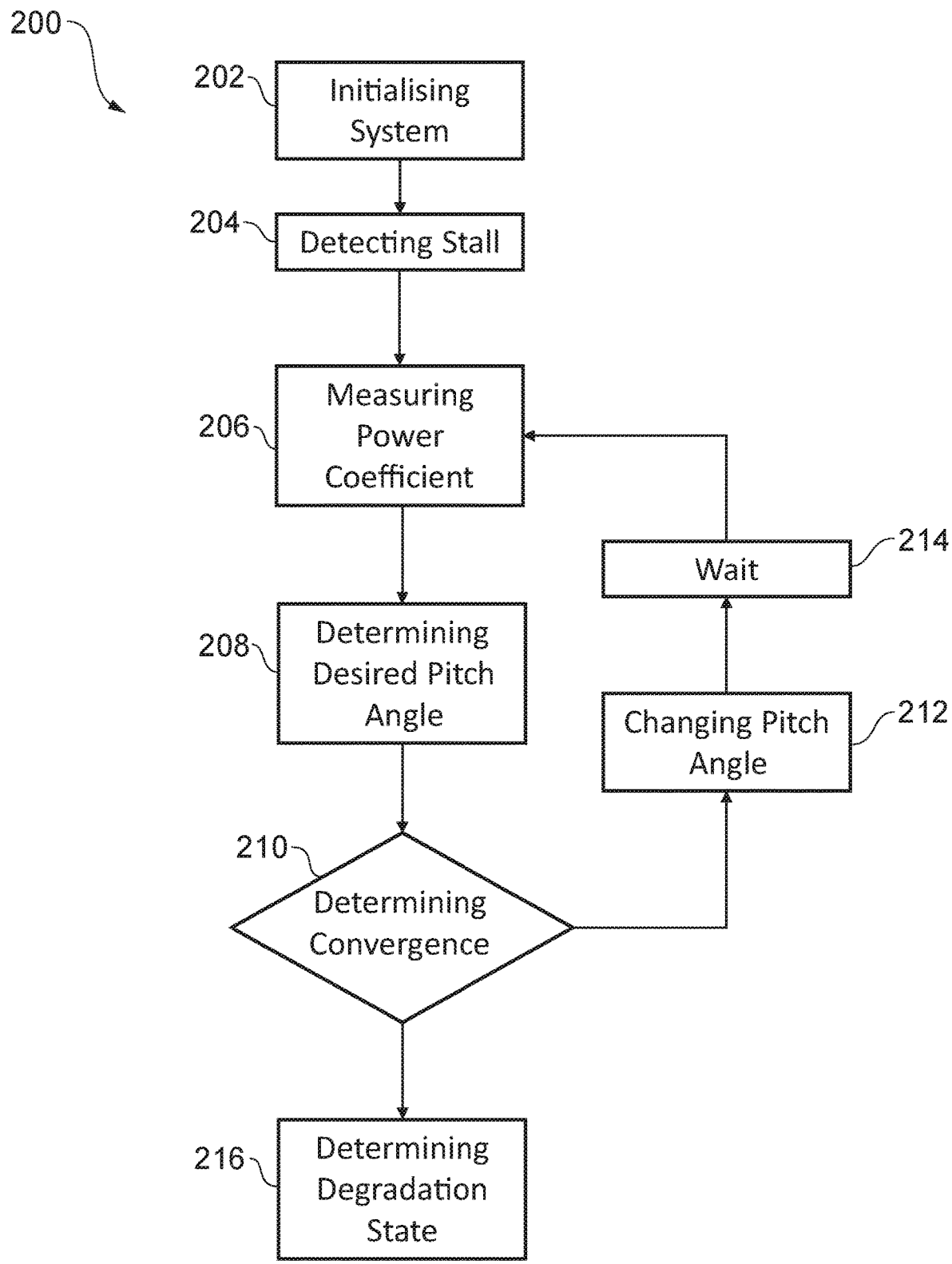
FIG. 6 is a flowchart illustrating the method of controlling a wind turbine blade.

Elements of the method is illustrated in FIG. 6 by flowchart 200. The method may begin at step 202 by initialising the system. Initialising the system may comprise providing the system with data about a wind turbine blade at a plurality of different degradation states, including a maximum power coefficient and a corresponding pitch angle of the blade at multiple degradation states and at multiple tip speed ratios. Initialising the system may also involve measuring a wind speed and a rotational speed of the rotor in order to determine a tip speed ratio.

At step 204, stall may be detected on the wind turbine blade. The stall may be detected using macroscale parameters of the wind turbine blade, such as determining that the power coefficient of the wind turbine is lower than the known maximum power coefficient for the tip speed ratio of the wind turbine blade by a significant amount. Alternatively, stall may be detected by using a statistical parameter determining a sensitivity of the wind turbine blade to a change in pitch angle. As an alternative to detection of stall, other indications of a reduced power coefficient may be detected.

Once stall is detected at step 204, the power coefficient may be determined at step 206.

The power coefficient may in an embodiment be a measured power coefficient. The power coefficient may be measured by measuring the wind speed and the generated power, as well as the air density. Direct measurements of the power coefficient may be difficult to obtain as the proper rotor available power may be difficult to obtain. As an alternative the power coefficient may be estimated. Different ways of estimating the power coefficient exists, e.g. adaptively obtaining a correction term obtained from an estimated rotor available power and add this correction term to the directly measured power coefficient. An advantage of the present invention is that even though the obtained power coefficient is not exact, power production may still be considerably improved in a degraded situation, as the resulting pitch angle will move close to the actual power optimal pitch angle.

With reference to FIG. 5, the obtained power coefficient may determine the point 152. The obtained power coefficient may be based on an instantaneous measurement of wind speed and blade speed, or may be a longer measurement, with multiple data points. A low pass filter may then be used to remove outlying results, which may be gusts of wind or erroneous data. Alternatively, the data may be averaged in order to improve the reliability.

The tip-speed ratio may also be measured at this stage and the measurement may be carried out similarly to the measurement schemes described about with reference to the power coefficient.

The obtained power coefficient may then be used to determine a desired pitch angle at step 208. Step 208 may therefore be equivalent to finding point 154 shown in FIG. 5. Subsequently to the determining of the desired pitch angle, it may be determined whether the desired pitch angle is sufficiently similar to the current pitch angle that the operating point has converged to a maximum power coefficient for the degradation state of the wind turbine blade. If convergence has not been determined, then the pitch angle of the wind turbine blade may be changed at 212, so as to become the desired pitch angle. There may then be a waiting period at step 214, which may last a predetermined time, in order to allow transients in the aerodynamic flow to reduce so that a more accurate measurement of the power coefficient may be made. In the case that the ice or other debris on the blade is reduced, the waiting period at step 214 may also allow a change in the degradation state of the wind turbine blade.

Subsequently, the power coefficient may be determined again at step 206 and steps 208 and 210 may be repeated.

If, at step 210, it is determined that the desired pitch angle is sufficiently close to the measured pitch angle, it may be determined that convergence has occurred and the degradation state of the wind turbine blade may be determined at step 216. The control method may also end at step 216 and an alternative control method may be employed. Convergence may also be determined by other calculations, such as by determining a distance to a line of maxima or a closeness between consecutively measured power coefficients.

In some cases, the measured power coefficient of the wind turbine blade may be inaccurate and may not give a true indication of the performance of the wind turbine blade. For example, when the wind turbine is starting up after being stationary the power coefficient may be lower due to acceleration effects—the lift generated by the blade may be used to increase the kinetic energy of the parts of the wind turbine as opposed to generating electricity.

The measured power coefficient may therefore be tested for validity. Such testing may comprise comparing the measured power to the nominal power. If the measured power is significantly below the nominal power, then power losses within the wind turbine may be large compared to the actual power produced. Hence, the measured power coefficient may not be representative of the actual power delivered by the rotor of the wind turbine.

If it is determined that the power coefficient is invalid, such as due to the measured values changing over time more than a predetermined amount, then an alternative blade control scheme may be used. Such a blade control scheme may comprise determining a desired pitch angle based on a pitch angle corresponding to a maximum power coefficient for a blade having no degradation. The method may comprise measuring a tip speed ratio for the blade and the desired pitch angle may be based on a pitch angle corresponding to a maximum power coefficient for a blade having no degradation at the measured tip speed ratio.

An offset may be applied to the pitch angle corresponding to a maximum power coefficient for a blade having no degradation, which may be a positive increase in pitch angle, in order to reduce the likelihood of stall.

Figure 7:
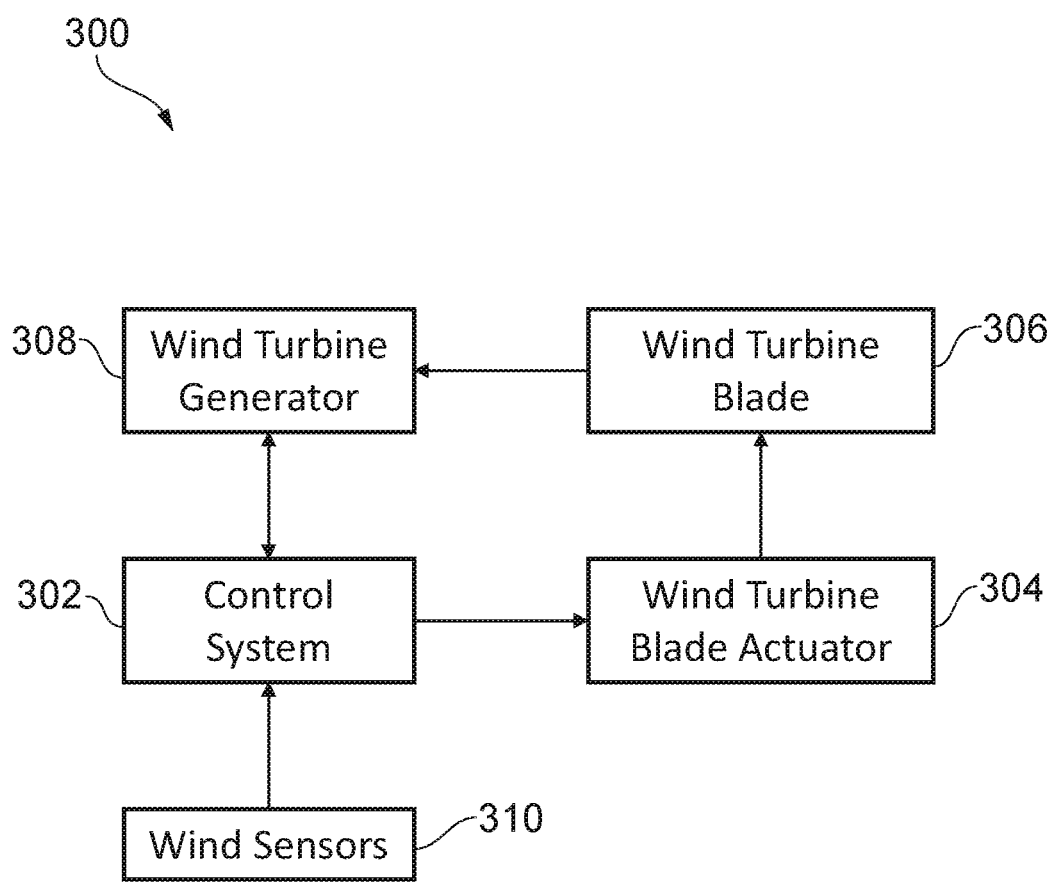
FIG. 7 is a schematic system diagram of a wind turbine.

FIG. 7 shows a schematic control diagram showing certain features of a wind turbine 300 which may be used within the method described above. The wind turbine 300 may comprise a control system 302. The control system may have a memory, which may store data pertaining to power coefficients and pitch angles of the blade at various states of degradation and may store instructions for carrying out the control method. The control system 302 may also comprise a processor for carrying out the method.

The control system 302 may control a wind turbine blade actuator 304, which may be a motor arranged to alter a pitch angle of a wind turbine blade 306. The wind turbine blade 306 may provide rotational movement to a wind turbine generator 308, which may generate electricity. The amount of electricity generated may therefore provide a measure of the torque from the wind turbine blade 306. The wind turbine generator 308 may supply electrical power to an electrical grid and the control system 302 may determine the power output by the wind turbine blade by measuring the power output to the grid by the wind turbine generator 308 and compensating for any power losses within the wind turbine 300.

The wind turbine 300 may also have wind sensors 310, which may measure wind speed and/or wind direction in order to determine a tip speed ratio of the wind turbine blade and the wind speed may also be used in determining the power coefficient of the wind turbine blade 306.

Although the invention has been described above with reference to one or more preferred embodiments, it will be appreciated that various changes or modifications may be made without departing from the scope of the invention as defined in the appended claims.

The invention claimed is:
1. A method of controlling of a wind turbine comprising:
providing a dataset comprising a plurality of pitch angle values of a wind turbine blade and corresponding expected power coefficients for the wind turbine, each pitch angle value corresponding to a maximum expected power coefficient for a respective degradation state of the wind turbine blade;

executing an iterative control scheme, the iterative control scheme comprising:
  determining a current pitch angle value as the current pitch angle of the wind turbine blade;
  obtaining a current power coefficient of the wind turbine by operating the wind turbine blade at the current pitch angle;
  determining a desired pitch angle value for the wind turbine blade, the desired pitch angle value being equal to one of the pitch angle values from the dataset corresponding to an expected power coefficient equal to the current power coefficient;
  changing the current pitch angle value and the current pitch angle of the wind turbine blade to the desired pitch angle value;
  calculating a difference between the desired pitch angle value of the previous iteration of the control scheme and the desired pitch angle value of the current iteration of the control scheme; and
  terminating the iterative control scheme when the difference is below a predetermined threshold.

2. The method of claim 1, wherein the dataset further comprises the plurality of pitch angle values and corresponding expected power coefficients at a plurality of tip speed ratios, and wherein the control scheme comprises estimating a current tip speed ratio for the wind turbine blade such that the determining the desired pitch angle value is based on the current tip speed ratio.

3. The method of claim 1, wherein the dataset comprises the plurality of pitch angle values of the wind turbine blade and corresponding expected power coefficients for the wind turbine for a state of the wind turbine blade having no degradation.

4. The method of claim 3, further comprising comparing the current power coefficient to a maximum power coefficient for a state of the wind turbine blade having no degradation.

5. The method of claim 4, further comprising using another blade control scheme if the difference between the current power coefficient and the maximum power coefficient is below a predetermined threshold.

6. The method of claim 1, further comprising determining a gain scheduling value to be multiplied with the current power coefficient.

7. The method of claim 6, wherein the gain scheduling value is set as a function of the difference between the desired pitch angle value and the pitch angle value corresponding to the pitch angle value with a maximal power coefficient for a state of the wind turbine blade having no degradation.

8. A wind turbine comprising:
at least one wind turbine blade; and
a control system arranged to control the at least one wind turbine blade in accordance with an operation, comprising:
  providing a dataset comprising a plurality of pitch angle values of the at least one wind turbine blade and corresponding expected power coefficients for the wind turbine, each pitch angle value corresponding to a maximum expected power coefficient for a respective degradation state of the at least one wind turbine blade;
  executing an iterative control scheme, the iterative control scheme comprising:
    determining a current pitch angle value as the current pitch angle of the at least one wind turbine blade;
    obtaining a current power coefficient of the wind turbine by operating the at least one wind turbine blade at the current pitch angle;
    determining a desired pitch angle value for the at least one wind turbine blade, the desired pitch angle value being equal to one of the pitch angle values from the dataset corresponding to an expected power coefficient equal to the current power coefficient; and
    changing the current pitch angle value and the current pitch angle of the at least one wind turbine blade to the desired pitch angle value;
    calculating a difference between the desired pitch angle value of the previous iteration of the control scheme and the desired pitch angle value of the current iteration of the control scheme; and
    terminating the iterative control scheme when the difference is below a predetermined threshold.

9. A computer program product comprising a non-transitory computer readable medium storing software code adapted to control a wind turbine blade of a wind turbine when executed on a data processing system;
wherein the software code when executed by one or more processors performs an operation, comprising:
  providing a dataset comprising a plurality of pitch angle values of a wind turbine blade and corresponding expected power coefficients for the wind turbine, each pitch angle value corresponding to a maximum expected power coefficient for a respective degradation state of the wind turbine blade;
executing an iterative control scheme, the iterative control scheme comprising:
  determining a current pitch angle value as the current pitch angle of the wind turbine blade;
  obtaining a current power coefficient of the wind turbine by operating the wind turbine blade at the current pitch angle;
  determining a desired pitch angle value for the wind turbine blade, the desired pitch angle value being equal to one of the pitch angle values from the dataset corresponding to an expected power coefficient equal to the current power coefficient;
  changing the current pitch angle value to the desired pitch angle value and causing a blade actuator to change the current pitch angle of the wind turbine blade to the desired pitch angle value;
  calculating a difference between the desired pitch angle value of the previous iteration of the control scheme and the desired pitch angle value of the current iteration of the control scheme; and
  terminating the iterative control scheme when the difference is below a predetermined threshold.

* * * * *